W. H. BENTLEY.
Saws.

No. 149,562.  Patented April 14, 1874.

Witnesses:

Inventor:
William H. Bentley
per A. R. Brown
Atty.

UNITED STATES PATENT OFFICE.

WILLIAM H. BENTLEY, OF WESTFORD, NEW YORK.

IMPROVEMENT IN SAWS.

Specification forming part of Letters Patent No. 149,562, dated April 14, 1874; application filed February 24, 1874.

*To all whom it may concern:*

Be it known that I, WILLIAM H. BENTLEY, of Westford, in the county of Otsego and State of New York, have invented certain new and useful Improvements in Saws; and I do hereby declare the following to be a full, clear, and exact description of the invention, such as will enable others skilled in the art to which it pertains to make and use it, reference being had to the accompanying drawings, which form part of this specification.

The object of this invention is to improve that class of saws used for crosscutting logs or timber, in which a series of cutting or scoring teeth, which cut the sides of the kerf, are interspersed with clearing-teeth, which remove the severed fibers of the timber. Experience has demonstrated that saws having teeth formed and arranged in the manner shown in the Patent No. 4,096, granted June 21, 1853, to Joseph H. Tuttle, combine these elements in a form which has been found to give an excellent result, but which failed to give such result under certain circumstances; for instance, when sawing large logs, the proportion of clearing to cutting teeth was found to be insufficient, the chip-chamber in front of the clearers being too small and not of the right shape, thus filling up and causing the saw to ride. To remedy these defects I have changed the proportion of the cutting and clearing teeth, as well as the shape of the chip-chamber in front of the clearers, giving it such a form as would cause it to roll the chip or shaving into a compact cylinder, thus causing it to occupy the smallest possible space; and the invention consists in the construction and arrangement of the teeth and chip-chambers of the saw, as will be hereinafter fully described and claimed.

In the accompanying drawings, similar letters of reference indicate corresponding parts in the different figures.

Figure 1:
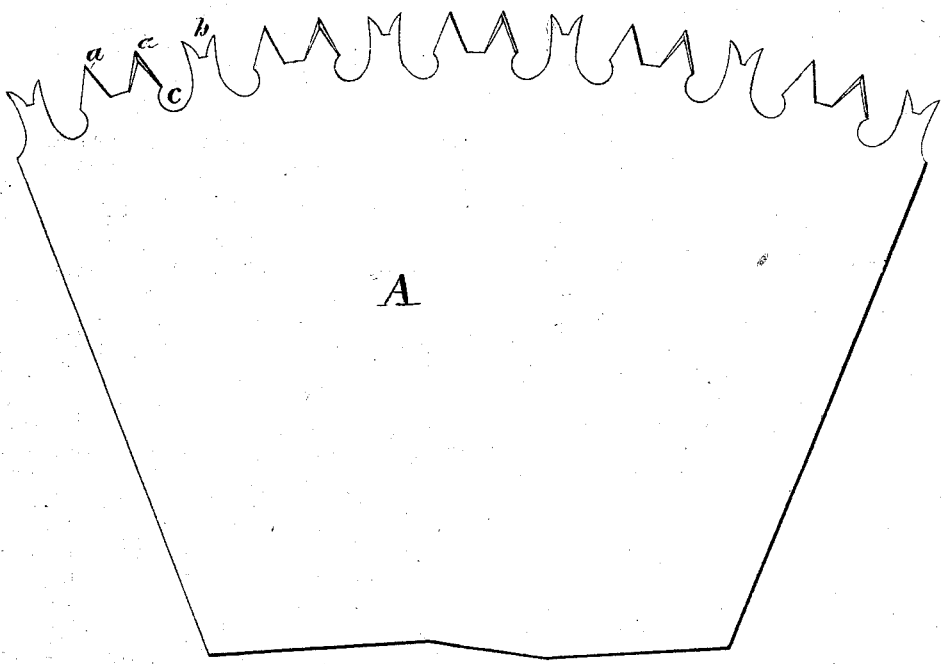
Figure 2:
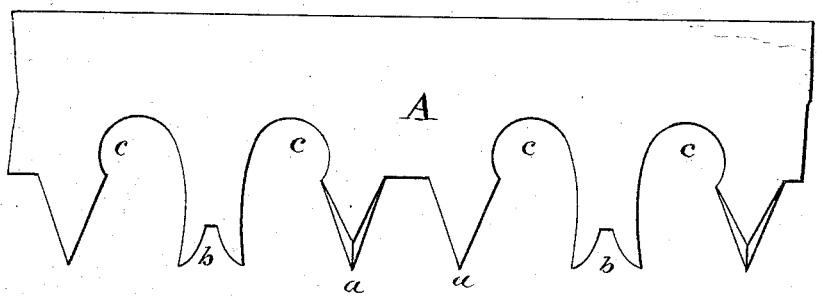

Figure 1 is a side view of a section of the saw. Fig. 2 represents a portion of the saw upon an enlarged scale, showing the exact shape and dress of the teeth and chip-chambers.

A is the saw-plate, provided with the cutting-teeth $a$ and clearing-teeth $b$, these being formed with two cutting edges or planes facing each other in opposite directions, which operate alternately as the saw is drawn to and fro. These clearers are separated from the teeth $a$ by the chip-chamber $c$, which is scroll-shaped, the portion having the longest radius forming the sides of the clearers, and diminishing by a gradually-curved line until it ends at the base of the adjacent cutting-tooth.

It will be evident that as the planing-point of the clearers cuts its shaving this form of chip-chamber will cause it to assume the shape of a spiral coil, thus enabling a much larger quantity, owing to the compactness with which it is rolled, to be carried than would be possible in a chip-chamber of equal area, but of the ordinary form, and a further inspection will show that this continually-enlarging form also allows the shaving to escape freely the instant that portion of the saw in which it is inclosed leaves the log.

Having thus described my invention, I claim as new and desire to secure by Letters Patent of the United States—

A saw having its scoring-teeth $a$ and clearing-teeth $b$ separated by the scroll-formed chip-chamber $c$, as and for the purpose specified.

In testimony that I claim the foregoing I have hereunto set my hand this 16th day of February, 1874.

WM. H. BENTLEY.

Witnesses:
ALEX. CUMMINGS,
E. C. BIDLAKE.